(12) United States Patent
Wang et al.

(10) Patent No.: US 7,878,057 B2
(45) Date of Patent: *Feb. 1, 2011

(54) SYSTEM FOR DETECTING FAILURES IN FUEL SYSTEMS

(75) Inventors: Zhong Wang, Westland, MI (US); Wenbo Wang, Novi, MI (US); Gary L. Rogers, Davison, MI (US); Scott A. Kegebein, Howell, MI (US); Lan Wang, Troy, MI (US); Yan Wang, Brighton, MI (US)

(73) Assignee: GM Global Technology Operations, Inc.

( * ) Notice: Subject to any disclaimer, the term of this patent is extended or adjusted under 35 U.S.C. 154(b) by 417 days.

This patent is subject to a terminal disclaimer.

(21) Appl. No.: 11/732,499

(22) Filed: Apr. 3, 2007

(65) Prior Publication Data

US 2008/0245130 A1    Oct. 9, 2008

(51) Int. Cl.
*G01F 23/00* (2006.01)

(52) U.S. Cl. .................................................. 73/290 R
(58) Field of Classification Search ................ 73/290 R
See application file for complete search history.

(56) References Cited

U.S. PATENT DOCUMENTS

| 4,409,832 | A | * | 10/1983 | Konjedic et al. ............... 73/292 |
| 5,812,060 | A | * | 9/1998 | DeSpain et al. ............. 340/618 |
| 6,002,328 | A | * | 12/1999 | Wallrafen ................ 340/450.2 |
| 2001/0035215 | A1 | * | 11/2001 | Tipton et al. ................. 137/571 |
| 2006/0065040 | A1 | | 3/2006 | Grunwald et al. |

* cited by examiner

*Primary Examiner*—Hezron Williams
*Assistant Examiner*—Alex Devito

(57) ABSTRACT

A diagnostic system and method includes a fuel level sensor that senses a fuel level in a fuel tank and a sensor diagnostic module that monitors a fuel transfer mechanism for a time period, that calculates a change in the fuel level, and that evaluates operation of the first fuel level sensor based on the change and the predetermined period.

4 Claims, 4 Drawing Sheets

SYSTEM FOR DETECTING FAILURES IN FUEL SYSTEMS

FIELD OF THE INVENTION

The present disclosure relates to fuel level monitoring in a vehicle, and more particularly to monitoring a fuel level in a vehicle having primary and a secondary fuel tanks.

BACKGROUND OF THE INVENTION

The statements in this section merely provide background information related to the present disclosure and may not constitute prior art.

Internal combustions engines combust an air and fuel (A/F) mixture within cylinders to produce drive torque. More specifically, the combustion events reciprocally drive pistons that drive a crankshaft to provide torque output from the engine. The fuel is delivered to the engine by a fuel system. The fuel systems of some vehicles include a plurality of fuel tanks. For example, some fuel systems include a primary fuel tank and a secondary fuel tank, wherein each fuel tank includes its own filler neck.

The fuel levels within the fuel tanks are monitored and the vehicle operator is informed as to the amount of fuel remaining in each tank. More specifically, a fuel level sensor is provided in each tank. Each fuel level sensor is responsive to the fuel level in a respective tank and generates a signal based thereon. The amount of remaining fuel is determined based on the signals. Conventional fuel level monitoring systems include rationality diagnostics to determine whether the fuel level sensors are functioning properly.

SUMMARY

A diagnostic system and method includes a fuel level sensor that senses a fuel level in a fuel tank and a sensor diagnostic module that activates a fuel transfer mechanism for a time period, that calculates a change in the fuel level, and that evaluates operation of the first fuel level sensor based on the change and the predetermined period.

In other features, the system further comprises an enablement module that enables the system when the enablement module determines an absence of active faults. The active faults include at least one of component diagnostic trouble codes, fuel level sensor out of range codes, and vehicle speed fault codes.

In other features, the system further comprises a fuel level detection module that detects input from the fuel level sensor and a second fuel level sensor wherein the second fuel level sensor senses a fuel level of a second fuel tank. The fuel level detection module verifies that the fuel level of the fuel tank exceeds an empty threshold and the fuel level of the second fuel tank is below a control threshold. The fuel level detection module determines a first fuel level of the fuel tank before activating the fuel transfer mechanism and determines a second fuel level of the fuel tank after the time period.

In other features, the sensor diagnostic module deactivates the fuel transfer mechanism when the time period exceeds a time threshold. The sensor diagnostic module determines a fail state of the fuel level sensor when the change falls below a fuel change threshold and determines a pass state of the fuel level sensor when the change exceeds the fuel change threshold. The fail operation includes a stuck-in-range operation.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
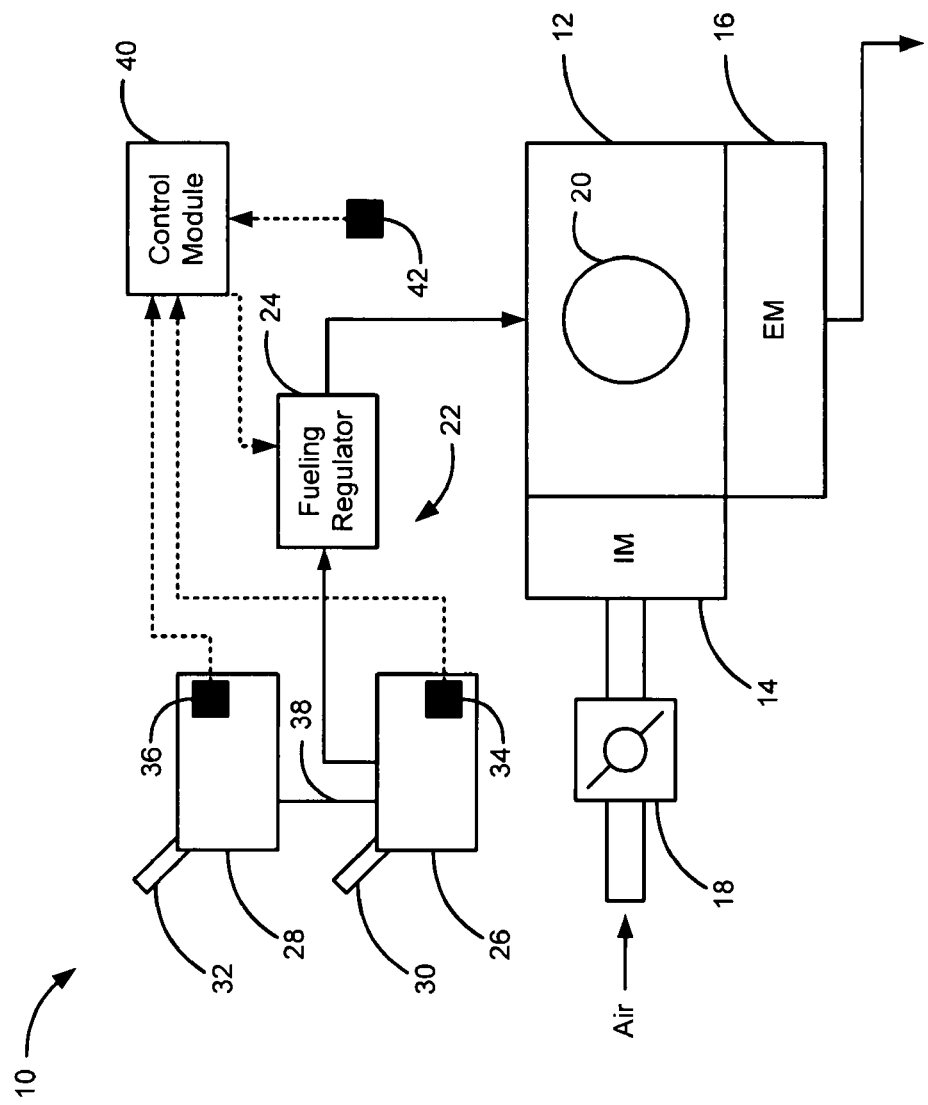
FIG. 1 is a functional block diagram of an exemplary vehicle including a diagnostic system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

A fuel level sensor may improperly report that a corresponding fuel tank is at a full state (i.e. stuck-in-full failure). If a stuck-in-full failure occurs, a transfer pump that transfers fuel from the secondary fuel tank to the primary fuel tank may unnecessarily remain active. Furthermore, a stuck-in-full failure may lead to a inaccurate calculation of fuel volume that falsely enables and/or disables major diagnostics.

Referring now to FIG. 1, an exemplary vehicle system 10 includes an engine 12 having an intake manifold 14 and an exhaust manifold 16. Air is drawn into the intake manifold 14 through a throttle 18. The air is mixed with fuel, and the fuel and air mixture is compressed and ignited within a cylinder 20 to reciprocally drive a piston (not shown) within the cylinder 20. Although a single cylinder 20 is shown, it is anticipated that the engine 12 can include a plurality of cylinders 20. The piston rotatably drives a crankshaft (not shown) to provide a drive torque output. Fuel is delivered to the engine 12 by a fuel system 22, which includes a fueling regulator 24, a primary fuel tank 26, and a secondary fuel tank 28. In the present implementation, the primary and secondary fuel tanks 26, 28 include respective fueling necks 30, 32. In various embodiments, the primary and secondary fuel tanks 26, 28 may include a common fueling neck.

Primary and secondary fuel level sensors 34, 36 sense fuel levels within first the primary and secondary fuel tanks 26, 28, respectively, and generate primary and secondary fuel signals indicating respective fuel levels. In various embodiments, the primary and secondary fuel level sensors 34, 36 may include a component such as a "float" that is buoyant and floats at a surface of the fuel of each of the respective fuel tanks 26, 28. The primary and secondary fuel level sensors 34, 36 may generate primary and secondary fuel signals based on the position of the floats within the primary and secondary fuel tanks 26, 28, respectively. A fuel transfer mechanism such as an electric transfer pump 38 transfers fuel between the primary and secondary fuel tanks 26, 28.

A control module 40 communicates with the fueling regulator 24, the primary fuel level sensor 34, and the secondary fuel level sensor 36. Additionally, the control module 40 receives input from other sensors 42 of the exemplary vehicle 10 including, but not limited to, oxygen sensors, engine coolant temperature sensors, mass airflow sensors, and/or engine speed sensors. The control module 40 executes a fuel sensor diagnostic system of the present invention. The fuel sensor diagnostic system evaluates the operational state of the secondary fuel level sensor 36 based on the primary and secondary fuel signals. For example, the fuel sensor diagnostic system determines whether the secondary fuel sensor 36 is in a "stuck-in-range" (e.g. stuck-in-full) failure state or operating properly. In other words, the fuel sensor diagnostic system determines whether the secondary fuel level sensor 36 is improperly, continuously sensing that the secondary fuel tank 28 is at a full state. Although the present implementation illustrates a fuel sensor diagnostic system operating on the secondary fuel level sensor 36, those skilled in the art can appreciate that a fuel sensor diagnostic system of the primary fuel level sensor 34 may function similarly to the fuel sensor diagnostic system described herein.

Figure 2:
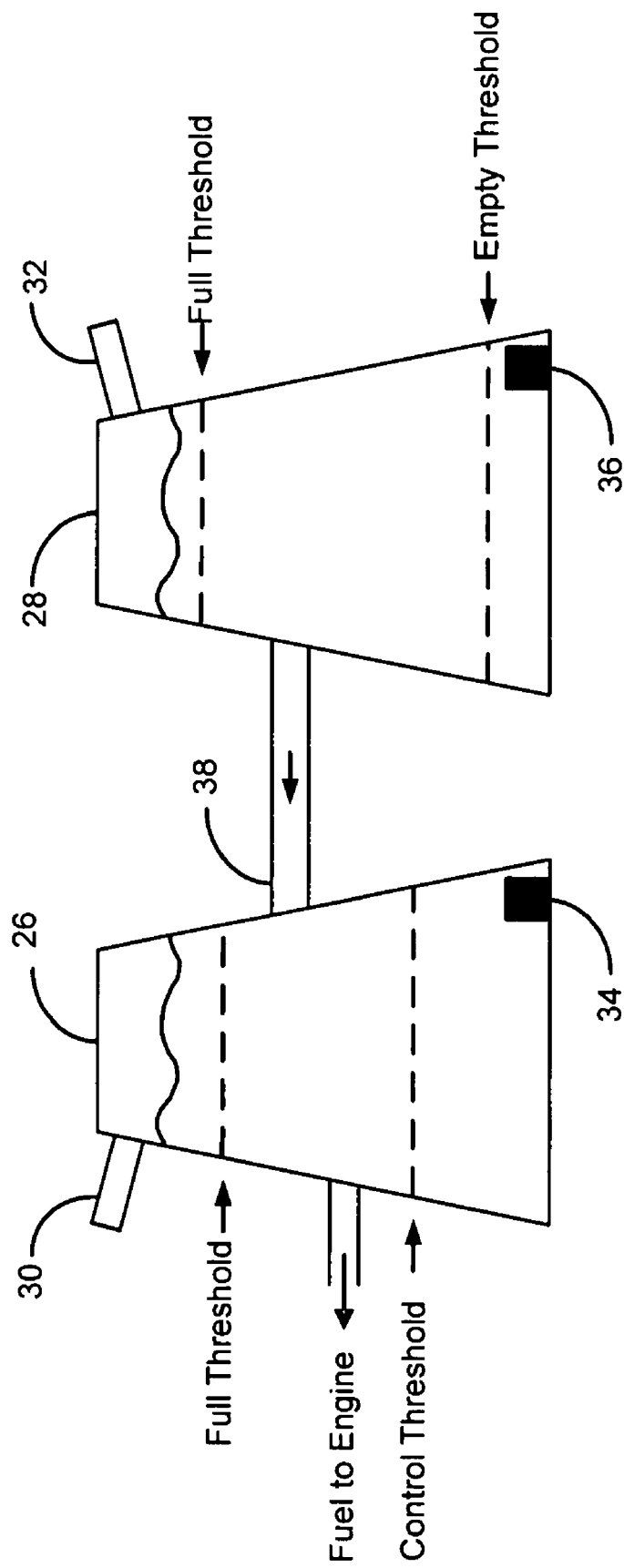
FIG. 2 is a functional block diagram illustrating primary and secondary fuel tanks according to the present invention.

Referring to FIG. 2, the primary and the secondary fuel tanks 26, 28 are shown. The primary fuel tank 26 supplies fuel to the engine 12 during operation of the vehicle 10. Preferably, the electric transfer pump 38 supplies fuel from the secondary fuel tank 28 to the primary fuel tank 26 when the fuel level of the primary fuel tank 26 falls below a control threshold. The primary fuel tank 26 also includes a first full threshold indicative of a full state of the primary fuel tank 26. The primary fuel level sensor 34 generates the primary fuel signal based on the actual fuel level of the primary fuel tank 26.

The secondary fuel tank 28 includes a second full threshold and an empty threshold. The second full threshold indicates whether the fuel level of the secondary fuel tank 28 has reached a full state, and the empty threshold indicates whether the second fuel tank 28 has fallen to an empty state. The secondary fuel sensor 36 generates the secondary fuel signal based on the actual fuel level of the secondary fuel tank 28.

Figure 3:
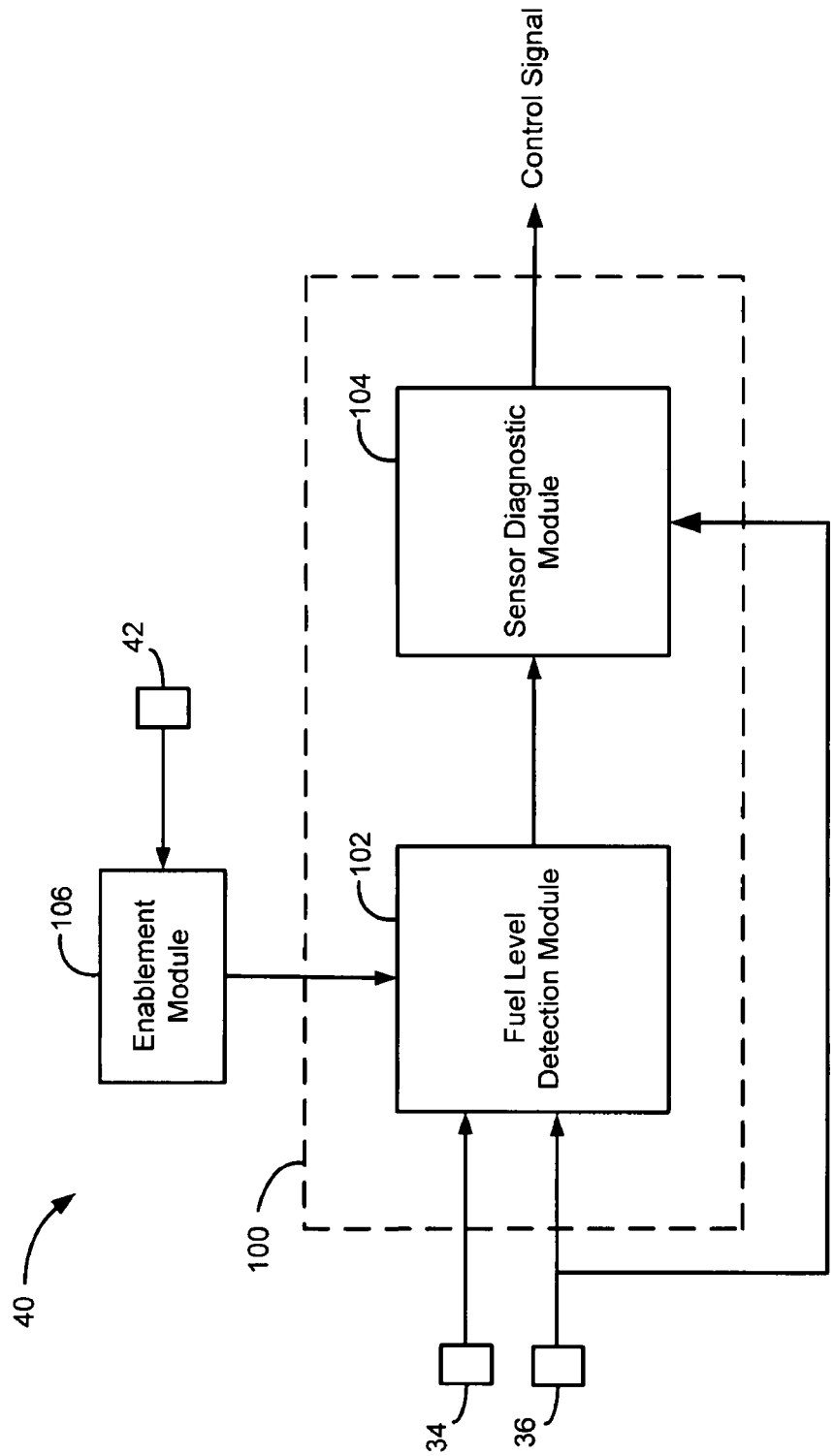
FIG. 3 is a functional block diagram illustrating an exemplary module that executes the diagnostic system of the present invention.

Referring now to FIG. 3, the control module 40 is shown in more detail. The control module 40 includes an exemplary fuel sensor diagnostic system 100 of the present invention. The fuel sensor diagnostic system 100 includes a fuel level detection module 102 and a sensor diagnostic module 104.

An enablement module 106 communicates with the other sensors 42. The enablement module 106 determines whether to enable the fuel sensor diagnostic system 100 by verifying that no active faults that may impact the proper operation of the fuel sensor diagnostic system 100 exist. The active faults include, but are not limited to, component diagnostic trouble codes, fuel level sensor out of range codes, and vehicle speed fault codes. If no active faults exist that may prevent the proper operation of the fuel sensor diagnostic system 100, the enablement module 106 enables the fuel sensor diagnostic system 100.

The fuel level detection module 102 communicates with the enablement module 106 and detects changes in fuel levels of the primary and secondary fuel tanks 26, 28 based on input received from the primary and secondary fuel level sensors 34, 36. For example, the fuel level detection module 102 verifies whether the fuel level of the primary fuel tank 26 is below the control threshold and whether the fuel level of the secondary tank 28 exceeds the empty threshold.

The sensor diagnostic module 104 communicates with the fuel level detection module 102. The sensor diagnostic module 104 activates the electric transfer pump 38 and stores a first time and a first fuel level value of the secondary fuel tank 28 when the electric transfer pump 38 turns on. In the present implementation, the electric transfer pump 38 transfers fuel from the secondary fuel tank 28 to the primary fuel tank 26. The electric transfer pump 38 transfers fuel to the primary fuel tank 26 until an active time (i.e. a time period of active operation) of the electric transfer pump 38 has exceeded a time threshold. The sensor diagnostic module 104 deactivates the electric transfer pump 38 and determines a second fuel level value of the secondary fuel tank 28 when the active time of the transfer pump exceeds the time threshold. The sensor diagnostic module 104 then determines whether a change in the fuel level (e.g. decrease in the fuel level) of the secondary fuel tank 28, resulting from the operation of the electric transfer pump 38, exceeds a fuel change threshold.

In the present implementation, the time and fuel change thresholds are calibrated and based on the operational characteristics of the electric transfer pump 38. If the change in fuel level of the secondary fuel tank 28 does not exceed the fuel change threshold, the sensor diagnostic module 104 generates a failure control signal indicating a stuck-in-full failure state of the secondary fuel level sensor 36. If the change in fuel level of the secondary fuel tank 28 does exceed the fuel change threshold, the sensor diagnostic module 104 generates a pass control signal.

Figure 4:
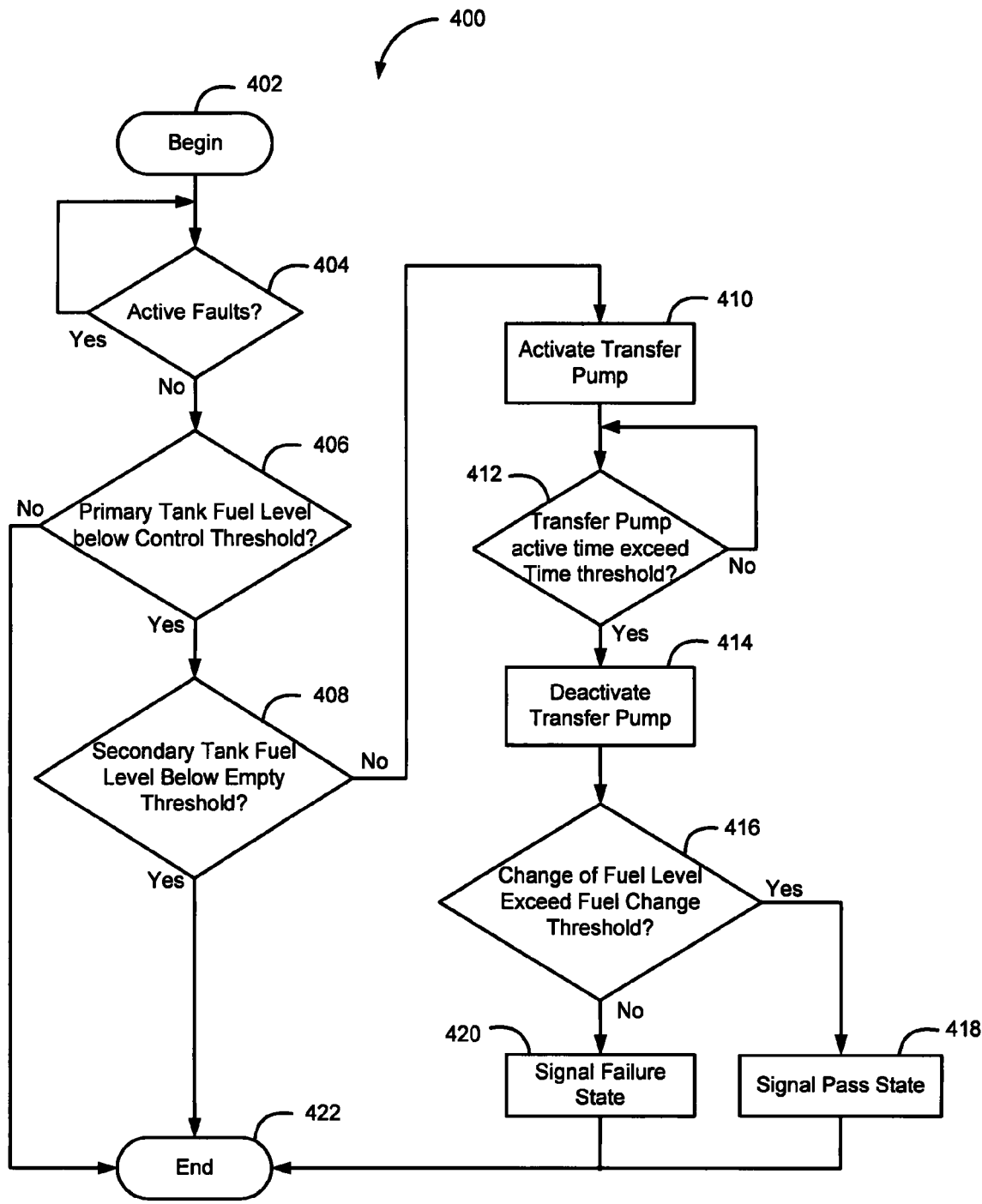
FIG. 4 is a flowchart illustrating the diagnostic system of the present invention.

Referring now to FIG. 4 an exemplary method 400 for controlling the diagnostic system will be described in more detail. Control begins the method 400 at step 402. In step 404, control determines whether any applicable active faults have been detected. If any applicable active faults exist, control returns to step 404. If control fails to detect any applicable active faults, control proceeds to step 406. In step 406, determines whether the fuel level of the primary fuel tank 26 is below the control threshold. If the fuel level of the primary fuel tank 26 is not below the control threshold, control proceeds to step 422. If the fuel level of the primary fuel tank 26 is below the control threshold, control proceeds to step 408. In step 408, control determines whether the fuel level of the secondary fuel tank 28 is below the empty threshold. If the fuel level of the secondary fuel tank 28 is below the empty threshold, control proceeds to step 422. If the fuel level of the secondary fuel tank 28 is not below the empty threshold, control proceeds to step 410.

In step 410, control activates the electric transfer pump 38. In step 412, control determines whether an active time of the electric transfer pump 38 exceeds the time threshold. If the active time does not exceed the time threshold, control returns to step 412. If the active time does exceed the time threshold, control proceeds to step 414. In step 414, control deactivates the electric transfer pump 38. In step 416, control determines whether a change in the fuel level of the secondary fuel tank 28 exceeds a fuel change threshold. If the change in the fuel level does exceed the fuel change threshold, control signals a pass state indicating that the secondary fuel level sensor 36 is operating properly in step 418. If the change in the fuel level does not exceed the fuel change threshold, control signals a failure state indicating that the secondary fuel level sensor 36 is in a stuck-in-full state in step 420. The method 400 ends in step 422.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A diagnostic system comprising:
a fuel level sensor that senses a fuel level in a fuel tank;
a sensor diagnostic module that activates a fuel transfer mechanism for a time period, that calculates a change in said fuel level, and that evaluates operation of said first fuel level sensor based on said change and said predetermined period; and
a fuel level detection module that detects input from said fuel level sensor and a second fuel level sensor wherein said second fuel sensor senses a fuel level of a second fuel tank;
wherein said fuel level detection module verifies that said fuel level of said fuel tank exceeds an empty threshold and said fuel level of said second fuel tank is below a control threshold, wherein said control threshold is independent of the empty threshold;
wherein said fuel level detection module determines a first fuel level of said fuel tank before activating said fuel transfer mechanism and determines a second fuel level of said fuel tank after said time period; and
wherein said sensor diagnostic module deactivates said fuel transfer mechanism when said time period exceeds a time threshold.

2. A diagnostic system as recited in claim 1:
wherein said sensor diagnostic module determines a fail state of said fuel level sensor when said change falls below a fuel change threshold and determines a pass state of said fuel level sensor when said change exceeds said fuel change threshold; and
wherein said fail state includes a stuck-in-range operation.

3. A method comprising:
detecting input from said fuel level sensor and a second fuel level sensor, wherein said fuel level sensor senses said fuel level in said fuel tank and said second fuel level sensor senses said fuel level of said second fuel tank;
verifying that said fuel level of said fuel tank exceeds an empty threshold and said fuel level of said second fuel tank is below a control threshold, wherein said control threshold is independent of the empty threshold;
determining a first fuel level in said fuel tank;
thereafter, activating a fuel transfer mechanism for a time period;
determining a second fuel level after said time period;
calculating a change in said fuel level;
evaluating operation of a full level sensor based on said change and said time period; and
deactivating said fuel transfer mechanism when said time period of said fuel transfer mechanism exceeds a time threshold.

4. A method as recited in claim 3 further comprising:
determining a fail state of said fuel level sensor when said change falls below a fuel change threshold and determining a pass state of said fuel level sensor when said change exceeds said fuel change threshold; and
wherein said fail state includes a stuck-in-range operation.

* * * * *